United States Patent [19]

Yang

[11] Patent Number: 5,896,135
[45] Date of Patent: Apr. 20, 1999

[54] SYSTEM AND METHOD FOR GENERATING 3D COLOR IMAGES WITH SIMULATED LIGHT SOURCES

[75] Inventor: Steven Shi-Long Yang, Fremont, Calif.

[73] Assignee: Seiko Epson Corporation, Tokyo, Japan

[21] Appl. No.: 08/903,496

[22] Filed: Jul. 30, 1997

Related U.S. Application Data

[63] Continuation of application No. 08/021,175, Feb. 23, 1993, abandoned, which is a continuation-in-part of application No. 07/861,417, Mar. 31, 1992, abandoned.

[51] Int. Cl.$^6$ ............................................. G06T 15/50
[52] U.S. Cl. ............................................. 345/427
[58] Field of Search ............................. 345/427–432

[56] References Cited

U.S. PATENT DOCUMENTS

| | | | |
|---|---|---|---|
| 4,866,637 | 9/1989 | Gonzalez-Lopez et al. | 345/426 |
| 4,901,064 | 2/1990 | Deering | 345/426 |
| 4,943,938 | 7/1990 | Aoshima et al. | 345/422 |
| 5,053,631 | 10/1991 | Perlman et al. | 364/748.14 |
| 5,063,375 | 11/1991 | Lien et al. | 345/426 X |
| 5,081,573 | 1/1992 | Hall et al. | 395/800.06 |
| 5,119,324 | 6/1992 | Ahsan | 364/736.03 |
| 5,226,171 | 7/1993 | Hall et al. | 395/800.09 |

FOREIGN PATENT DOCUMENTS 0248626  12/1987  European Pat. Off. .

OTHER PUBLICATIONS

Hayes, Computer Architecture and Organization, 1978, pp. 228–230, 1978.

International Search Report for PCT/JP 93/00376 mailed Jul. 7, 1993.

Electronic Design, Horng-Yee Chou et al, "Fortified PC At Poised For Shaded Solids Modeling", vol. 34, No. 14, Jun. 1986, pp. 95–100.

Computer Graphics Principles and Practice, J. Foley, A. van Dam, S. Feiner, and J. Hughes, Addison–Wesley Publishing Co., Chapter 16 (1990).

Computer Architecture: A Quantitative Approach, J. Hennessy and D. Patterson, pp. 200–215, Morgan Kaufmann Publishers (1990).

Primary Examiner—Anton Fetting
Attorney, Agent, or Firm—Sterne, Kessler, Goldstein & Fox P.L.L.C.

[57] ABSTRACT

A system and method for generating three-dimensional (3D) color images with a simulated light sources. The operation of producing 3D images involves a complicated scheme of time consuming instructions issued by a controller to obtain 3D images. The present invention performs this result faster and more efficiently than conventional technology. The production of 3D color images according to the present invention is performed by a system. A controller manages the flow of data for the system. Control of the system generally occurs as follows: Signal characteristics representing light direction, view direction and a normal unit vector enter an input queue. The data is then written into a register file at assigned locations. After being written into the register file, light signals are pipelined into a floating point multiplier and accumulator (FMAC) for computation. Once the FMAC performs the requested computation it is either written back into the register file at a designated location in the register file or reused immediately in a next cycle.

19 Claims, 7 Drawing Sheets

| CLOCK | OPERATION ISSUED | | |
|---|---|---|---|
| 1 | V.V = Vx*Vs; | 1 | |
| 2 | L.L = Lx*Lx; | 2 | |
| 3 | | 3 | V1x = Vx*rv; |
| 4 | | 4 | V1y = Vy*rv; |
| 5 | | 5 | V1z = Vz*rv; |
| 6 | | 6 | L1x - Lx*rl; |
| 7 | V.V + = Vy*Vy; | 7 | L1y - Ly*rl; |
| 8 | L.L + = Ly*Ly; | 8 | L1z - Lz*rl; |
| 9 | | 9 | |
| 10 | | 50 | |
| 1 | | 1 | |
| 2 | | 2 | Hz = L1x + V1x; |
| 3 | V.V + = Vz*Vz; | 3 | Hy = L1y + V1y; |
| 4 | L.L + = Lz*Lz; | 4 | Hz = L1z + V1z; |
| 5 | | 5 | L1.N1 = L1x*N1x; |
| 6 | | 6 | |
| 7 | | 7 | |
| 8 | | 8 | H.H = Hx*Hx; |
| 9 | \| V \| = sqrt(V.V); | 9 | H.N1 = Hx*N1x; |
| 20 | | 60 | |
| 1 | | 1 | L1.N1 = L1y*N1y; |
| 2 | \| L \| = sqrt(L.L); | 2 | |
| 3 | | 3 | |
| 4 | | 4 | H.H + = Hy*Hy; |
| 5 | | 5 | H.N1 + = Hy*N1y; |
| 6 | | 6 | |
| 7 | | 7 | L1.N1 + = L1z*N1z; |
| 8 | | 8 | |
| 9 | | 9 | |
| 30 | | 70 | H.H + = Hz*Hz; |
| 1 | rv = 1/\| V \| ; | 1 | H.N1 + = Hz*N1z; |
| 2 | | 2 | |
| 3 | | 3 | |
| 4 | rl = 1/\| L \| ; | 4 | |
| 5 | | 5 | |
| 6 | | 6 | \| H \| = sqrt(H.H); |
| 7 | | 7 | |
| 8 | | 8 | |
| 9 | | 9 | |
| 40 | | 80 | |

| CLOCK | OPERATION ISSUED |
|---|---|
| 1 | L.L = Lx*Lx; |
| 2 | V.V = Vx*Vx; |
| 3 | L.V = Lx*Vx; |
| 4 | L.N1 = Lx*N1x; |
| 5 | V.N1 = Vx*N1x; |
| 6 | |
| 7 | L.L + = Ly*Ly; |
| 8 | V.V + = Vy*Vy; |
| 9 | L.V + = Ly*Vy; |
| 10 | L.N1 + = Ly*N1y; |
| 11 | V.N1 + = Vy*N1y; |
| 12 | |
| 13 | L.L + = Lz*Lz; |
| 14 | V.V + = Vz*Vz; |
| 15 | L.V + = Lz*Vz; |
| 16 | L.N1 + = Lz*N1z; |
| 17 | V.N1 + = Vz*N1z; |
| 18 | |
| 19 | \|L\| = sqrt(L.L); |
| 20 | |
| 21 | H.H = 2 * L.V; |
| 22 | |
| 23 | |
| 24 | |
| 25 | \|V\| = sqrt(V.V); |
| 26 | |
| 27 | |
| 28 | |
| 29 | |
| 30 | |
| 31 | rl = 1/\|L\|; |
| 32 | |
| 33 | |
| 34 | |
| 35 | |
| 36 | |
| 37 | rv = 1/\|V\|; |
| 38 | |
| 39 | |
| 40 | |
| 41 | |
| 42 | |
| 43 | H.H * = rl; |
| 44 | L1.N1 = L.N1 * rl; |
| 45 | |
| 46 | |
| 47 | |
| 48 | |
| 49 | H.H = H.H * rv + 2; |
| 50 | V1.N1 = V.N1 * rv; |
| 51 | |
| 52 | |
| 53 | |
| 54 | |
| 55 | \|H\| = sqrt(H.H); |
| 56 | H.N1 = L1.N1 + V1.N1; |
| 57 | |
| 58 | |
| 59 | |
| 60 | |
| 61 | |
| 62 | |
| 63 | |
| 64 | |
| 65 | |
| 66 | |
| 67 | H1.N1 = H.N1 / \|H\|; |
| 68 | |
| 69 | |
| 70 | |

SYSTEM AND METHOD FOR GENERATING 3D COLOR IMAGES WITH SIMULATED LIGHT SOURCES

This application is a continuation of application Ser. No. 08/021,175, filed Feb. 23, 1993, abandoned, which is a continuation-in-part of application Ser. No. 07/861,417, filed on Mar. 31, 1992 now abandoned.

BACKGROUND OF THE INVENTION

1. Field of the Invention

The present invention relates generally to computer graphics systems and methods, and more particularly, to the color generating of illumination produced by simulated light sources.

2. Related Art

The goal of most graphics systems is to humanize information. To realize this goal it is necessary to produce realistic three dimensional (3D) color images in real-time.

Producing local light illumination on an object is one of the most time consuming tasks for a graphics system. The basic lighting equation for one local light is:

$$C\_i = Ca\_i + Cd\_i[Lc\_i(L1.N1)] + Cs\_i[Lc\_i(H1.N1)^{Oe}]. \quad \text{(eq. 1)}$$

In a computer graphics system, the color of an object can be denoted as a red, green and blue triple (RGB). The color of a lighted object is produced by one or more light sources. One type of light source is called a "local light source" or a "local light". Local light refers to the properties of color light at a particular point on an object.

Figure 1:
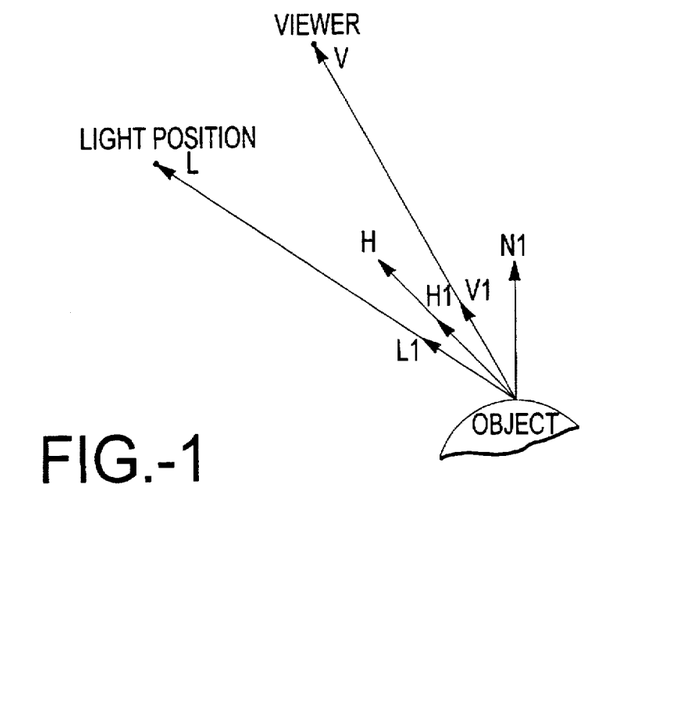
FIG. 1 is a diagram indicating the orientation of the vectors L, L1, H, H1, V, V1, and N1 associated with a light position, object, and viewer in accordance with the present invention.

Referring to FIG. 1, the lighted objects and local lights are placed in a 3 dimensional coordinate space which has 3 axes such as: x, y and z. According to the axes, a point P and a vector V in a 3 dimensional space can be denoted by their coordinate triples (Px, Py, Pz), and (Vx, Vy, Vz), respectively. $C\_i$, $Ca\_i$, $Cd\_i$, $Cs\_i$, and $Lc\_i$ are components of RGB triples. In other words, "i" represents the red, green or blue component of light. $C\_i$ is the final color of an object to be generated on screen. L1, H1, N1 are unit vectors in 3 dimensional space (unit vector is distinguished by the number "1" after the vector letter). L stands for light direction vector, V stands for view direction vector, H stands for the half angle vector (between vector L and vector V) shown in FIG. 1.

The unit vector L1 points from the object to the light. N1 is the unit normal vector of the object surface. H1 is the unit normalized H vector, where H=(L1+V1) (half angle vector between L and V), and V1 is a unit vector which points from the object to the viewer.

$Ca\_i$, $Cd\_i$, $Cs\_i$ and Oe are the material property parameters of the object surface. These parameters are all simple predetermined coefficients. $Ca\_i$ stands for ambient light, Cd stands for diffusion coefficient, and Cs stands for the specular reflection coefficient. Oe is a power exponent. $Lc\_i$ is the light source color component (i.e., R, G, B).

L1.N1 is the vector dot product of L1 and N1. Other dot products are denoted in the same way. It should be noted that each vector consists of magnitude and direction. An in depth discussion producing color light is discussed in more detail in Foley, et al., *Computer Graphics: Principles and Practice*, pp. 721–734, Addison-Wesley Publishing Co., 1990.

The bottle neck in most graphics systems involves determining L1.N1 and H1.N1 in (eq. 1). In conventional systems, normally, the vector L from the object to the light and V from the object to the viewer are generated first. In order to generate L1.N1 and H1.N1, the standard graphics system will then instruct the processor to normalize L and V to produce L1 and V1, then H=(L1+V1), and H.H, etc. If the processor is pipelined, it takes several cycles to generate the result after an operation is issued in hardware (execution latency). If the next operation needs to use this result as an input, then it must wait for the result of the previous operation. If there is no other operations that may be performed in the intervening cycles, many no-operation cycles are incurred. As a result, execution time is slowed. In other words, the graphics system will not receive RGB colors fast enough for real-time display of 3D color images. Additionally, the processors' ability to perform other functions in parallel is significantly reduced.

Therefore, what is needed is graphics system able to generate 3D color images with simulated light sources faster and more efficiency than is presently possible.

SUMMARY OF THE INVENTION

The present invention is a system and method for generating three-dimensional (3D) color images with simulated light sources. The operation of producing 3D images involves a complicated method of issuing time consuming instructions to a processor in order to obtain 3D images. The present invention utilizes a system and method that performs these instructions faster and more efficiently than conventional technology.

The present invention tailors its control of the processor to conform with the parallelism and pipelining of the system in which it is implemented. Applying the present invention to a sequential paper and pencil method of computation would appear illogical to most people skilled in the art. However, when performed in conjunction with the system hardware this unorthodox invention yields superior throughput characteristics to conventional methods. This is accomplished by reducing the amount of conflicts caused by pipelined data dependent instructions and calculations. Accordingly, the system remains busier than conventional hardware systems and is able to provide the frame buffer with RGB triples to be displayed faster than was possible.

The production of 3D color images is performed by a pipelined graphics system. In one stage of the pipelined graphics system, a dedicated hardware processor performs dot product production calculation in accordance with a controller, which manages the flow of signals for the processor.

Control of the system generally occurs as follows: Signal characteristics representing light direction, view direction and a unit normal vector enter an input queue. Data (representing the signals) is then written into a register file at assigned locations (data can also enter a Floating-Point Multiplier and Accumulator (FMAC) directly bypassing the register file in certain cases). After being written into the register file, light signals are sent to the FMAC for computation according to the controller's instructions. Once the FMAC performs the requested computation it is either written back into the register file at a designated location in the register file or reused immediately in a next cycle. The method describing how the controller manages the dot product processor (register files, latches, multiplexers and FMAC) is described as follows:

In a first processing stage, five dot product processes are sent by the controller. Each process involves issuing instructions and storing the results of these instructions in a particular storage location for later use in a subsequent data cycles. The first five instructions sets performed by the FMAC include performing: (1) the light direction vector dotted with the unit normal vector, (2) the light direction vector dotted with itself, (3) the light direction vector dotted with the view direction vector, (4) the view direction vector dotted with itself and (5) the view direction vector dotted with the unit normal vector. The exact order of each instruction is flexible.

In a second processing stage, the controller issues three general instructions sets in accordance with results from the first processing cycle. These instructions include determining and storing: (1) the magnitude of the light direction vector, (2) the magnitude of the view direction vector and (3) a first partial result of the half angle dot product. The exact order of instructions in this processing cycle is flexible.

In a third processing stage, the controller issues two instruction sets in accordance with results from the first and second processing cycles. These instructions include determining and storing: (1) the inverse magnitude of the light direction vector; and (2) the inverse magnitude of the view direction vector.

In a fourth processing stage, the controller issues three instruction sets in accordance with results from the three previous data stages of above. These instructions include determining and storing: (1) a second partial result of the half angle vector dot product; (2) the final result of the light direction unit vector dotted with the normal unit vector; and (3) the view direction unit vector dotted with the normal unit vector.

In a fifth processing stage, the controller issues two instruction sets in accordance with results from the previous four data stages. These instructions include determining and storing: (1) the final result of the half angle vector dot product; and (2) the result of half angle vector dotted with the normal unit vector (the spectral light source reflection coefficient).

In a sixth processing stage, the controller issues one instruction in accordance with the previous data stages. This instruction includes determining and storing the magnitude of the half angle. In a seventh and final processing stage, the controller issues an instruction for determining and storing the half angle unit vector dotted with normal unit vector in accordance with the previous pipeline stages.

As a result of the aforementioned process, the crucial parameters of L1.N1 and H1.N1 needed to generate the appropriate signals for color light is obtained in fewer clock cycles than could previously be performed. Under conventional technology, due to latency assumptions and application of processor storage and functional elements, L1.N1 and H1.N1 cannot be issued in fewer than 88 cycles (by the controller) and is not available for use by the graphics system for 97 cycles. The present invention performs the same function for the same computation saves at least 21% of the execution time, since the operations can be completely issued in approximately 67 cycles.

DETAILED DESCRIPTION OF THE PRESENT INVENTION

1.0 Graphics System

Figure 2A:
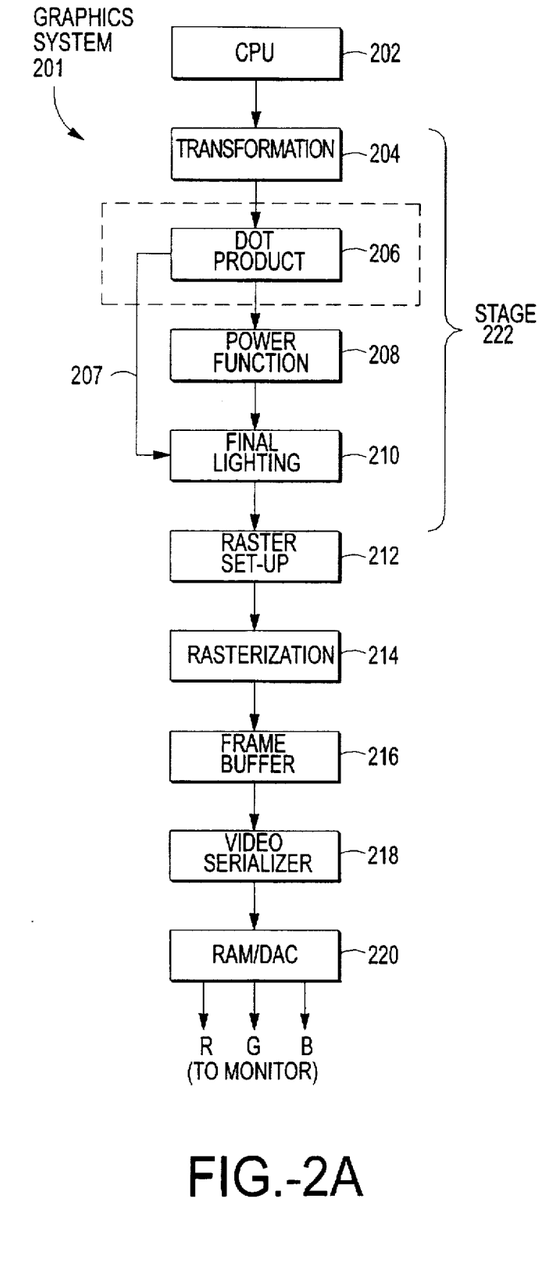
FIG. 2A is a block diagram of a graphics system 201.

FIG. 2A is a block diagram of a graphics system 201. Graphics system 201 includes: a central processor unit (CPU) 202, a processor stage 222, a raster set-up unit 212, rasterization unit 214, a frame buffer 216, a video serializer 218 and a Random Access Memory/Digital-to-Analog Converter (RAM/DAC) 220.

Central processor 202 is the host of graphics system 201. Processor stage 222 includes a transformation processor 204, a dot product processor 206, power function processor 208, and a final lighting processor 210. Processor stage 222 provides RGB signals necessary for display of 3D color images. Processor stage 222 will be described below in more detail below.

Raster set-up unit 212 generates parameters necessary for rasterization unit 214. Rasterization unit 214 generates pixel addresses and color for frame buffer 216. Frame buffer 216 is a dedicated memory for drawing and display data. All or part of the data stored in frame buffer 216 is displayed on a monitor (not shown). The video serializer 218 converts from frame buffer format (interleaved pixel format) to serial format for video. RAM/DAC 220 converts a video signal to its analog signal. Elements 202, 212, 214, 216, 218, 220 would be apparent to a person skilled in the relevant art.

Graphics system 201 is pipelined. In order to speed-up the pipeline it is necessary to speed-up the slowest stage of the pipeline. Dot product processor 206 is the slowest stage the pipeline. Therefore, in order to speed RGB triples for display to the monitor (not shown), it is necessary to increase the efficiency and speed of dot product processor 206.

Figure 2B:
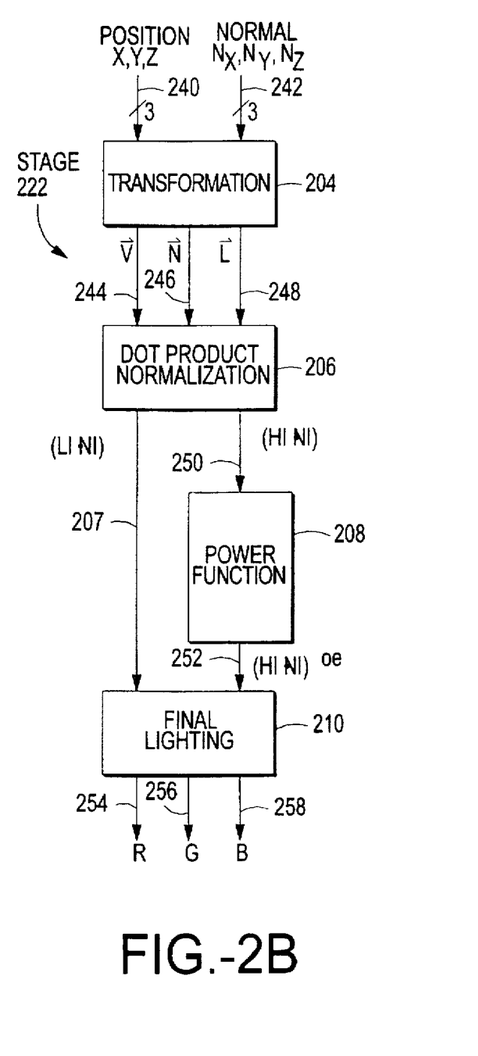
FIG. 2B is a block diagram of data stage 222 showing input and output signals.

FIG. 2B shows a stage 222 of graphics system 201. In other words, FIG. 2B shows a data flow for generating color from local light sources for a vertex. Entering transformation processor 204 are position signals 240 and normal signals 242 for a vertex point for an object in space. Exiting transformation processor 204 are vectors 244, 246, 248 in view space. Exiting dot product normalization processor 206 (time critical processor) are signals L1.N1 207 (which bypasses power function processor 208) and H1.N1 250. Power function processor 208 provides signal $(H1.N1)^{Oe}$ 252. Then signals 207, 252 enter final lighting processor 210 to produce RGB triple signals 254, 256, 258, respectively for the vertex.

Besides vector 244, 246, and 248, the transformation processor 204 also generates the address signals (not shown)

for the vertex on a monitor screen (not shown). These address signals are passed through processors 206, 208, 210, and sent to raster set-up 212. When passing through these address signals combined with the color signals generated by final lighting processor 210, address signals are used to generate raster set-up parameters for rasterization 214.

Figure 3:
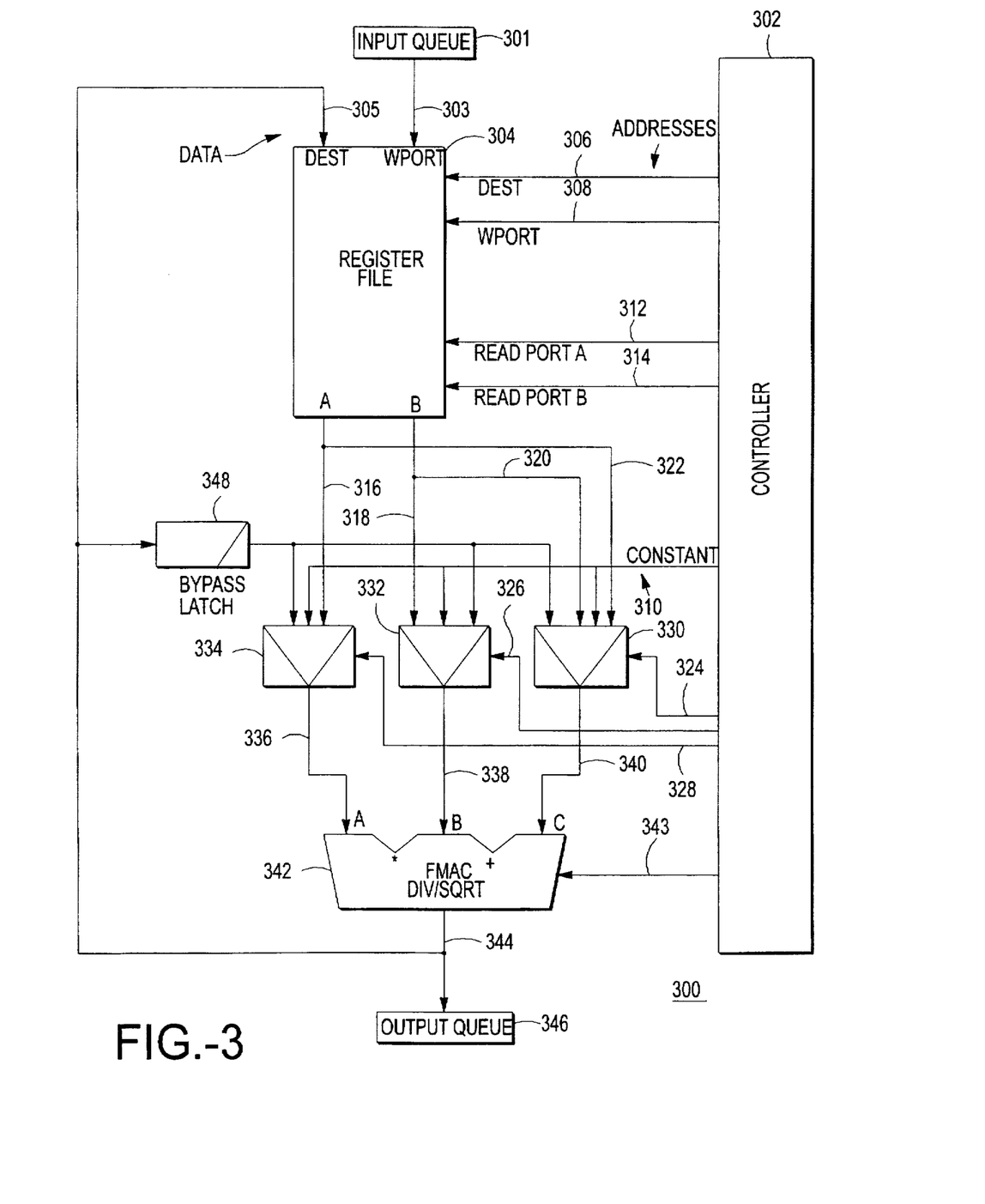
FIG. 3 is a block diagram of a representative processor 300 for performing the computations needed to control the data flow and operations for dot product processor 206.

FIG. 3 is a block diagram of a representative processor used in processors 204, 206, 208 and 210. The generic processor 300 includes the following elements: input queue 301, a controller 302, register file 304, multiplexers 330, 332, 334 a floating point multiply and accumulate unit (FMAC) 342 (having divide and square root functions), and output queue 346. Input queue 301 and output queue 346 interface two processors. Therefore, two processors coupled together share a queue. Depending on which position the processors, input queue 301 for one processor is the output queue 346 for the other processor. For example input queue 301 for processor 206 is the output queue 246 for processor 204. In the preferred embodiment processor stage 222 is one single processor (to be described), but can be any combination of pipelined processors connected serially.

The following discussion below will be directed to transformation processor 204, dot product processor 206, and power function processor 208 all employing processor 300.

Controller 302 is used to control the various functional stages and registers of embodiment 300. Controller 302 is micro-coded. Micro-coded control is described in *Computer Architecture: A Quantitative Approach*, J. Hennessy and D. Patterson pp. 200–215, FIGS. 5.1 & 5.3., Morgan Kauffmann Publishers (1990) and would be apparent to implement given the following discussion for a person skilled in the relevant art. Controller 302 provides a dest control signal to register file 304 by a control path 306. Dest stands for a destination address of an operation to be stored in the register file 304. For instance, it points to which register to store a data result 305 from FMAC 342. It should be noted that register file 304 is an arrangement of storage devices having their locations denoted by addresses.

Controller 302 provides a command wport to the register file 304 by a path 308. Wport stands for write port of register file 304 and receives information from input queue 301.

Controller 302 provides constant values (signals) for FMAC 342 through multiplexers 330, 332, 334 by a path 310. Typically the values for constants are "1" or "2" as shown in the data flow figures discussed below. Controller 302 provides a read port A command to register file 304 via a path 312. Similarly, controller 302 provides a command read port B to register file 304 via signal 314. For instance, Lx, N1x, and Vx are signals received and stored in register file 304 from input queue 301. Controller 302 sends out a command to readout locations of a particular data variable within the register file 304 where the data variable is stored. The values or signals are read out of both the A port and the B port to multiplexers 332, 334, 330 connected to register file 304.

Controller 302 also provides signals 324, 326, 328 to respective multiplexers 330, 332, 334 indicating whether to select from the A port or B ports or from bypass latch 348. Bypass latch 348 speeds results calculated by FMAC 342 for immediate re-use if needed and avoids storage in register file 305.

Controller 302 also sends a control signal 343 to FMAC 342 indicating what operation to start. All control signals mentioned above occur in one clock cycle.

Generally, all operands (referring to FIGS. 4–7 anything to the right of an equation) is read from the register file 304.

These operands are instruction signals eventually sent to FMAC 342 for computation. The results from FMAC 342 are stored in a specific location in register file 304 indicated by the symbol on the left hand side of the equation. For example, in FIG. 6A (to be explained in more detail below) during clock 1, Lx and Lx would be read from both the A port and B port of register file 304. FMAC 342 would perform the multiplication of signals Lx*Lx. The result, L.L would be sent from FMAC 342 via data path 305 to register file 304 and stored in a register at a location L.L. All elements of embodiment 300 would be apparent to a person skilled in the art given the detailed description of the present invention.

The following equations are provided as proof to support the system and method of the present invention in mathematical format for those who are interested:

$$H.H = (L1+V1).(L1+V1) \quad \text{(eq. 2)}$$

$$= L1.L1 + L1.V1 + V1.L1 + V1.V1 \quad \text{(eq. 3)}$$

$$= 2 + 2(L1.V1) \quad \text{(eq. 4)}$$

$$(\text{since } L1.L1=1, V1.V1=1 \text{ and } L1.V1=V1.L1) \quad \text{(eq. 5)}$$

$$= 2 + 2(L.V) (1/|L|)(1/|V|); \quad \text{(eq. 6)}$$

$$(|L| \text{ and } |V| \text{ represent the magnitude of L and V respectively)(eq. 7)}$$

$$H.N1 = L1.N1 + V1.N1; \text{ and} \quad \text{(eq. 8)}$$

$$H1.N1 = H.N1/|H|. \quad \text{(eq. 9)}$$

In the preferred embodiment, it is assumed that a single FMAC 342 circuit is used, which supports three operations: (A*B)+C; A/B; and, square-root(A). It is also assumed that FMAC 346 can start one operation per cycle, and that the operation "(A*B)+C" has a latency of 6 cycles, and the operations "A/B" and square-root(A) each need 12 cycles to complete. It should be noticed that operation "A*B" can be done by "A*B+0" and A+B can be done by A*1+B. The assumptions are made for the example only, and are not required by the invention.

Figure 4A:
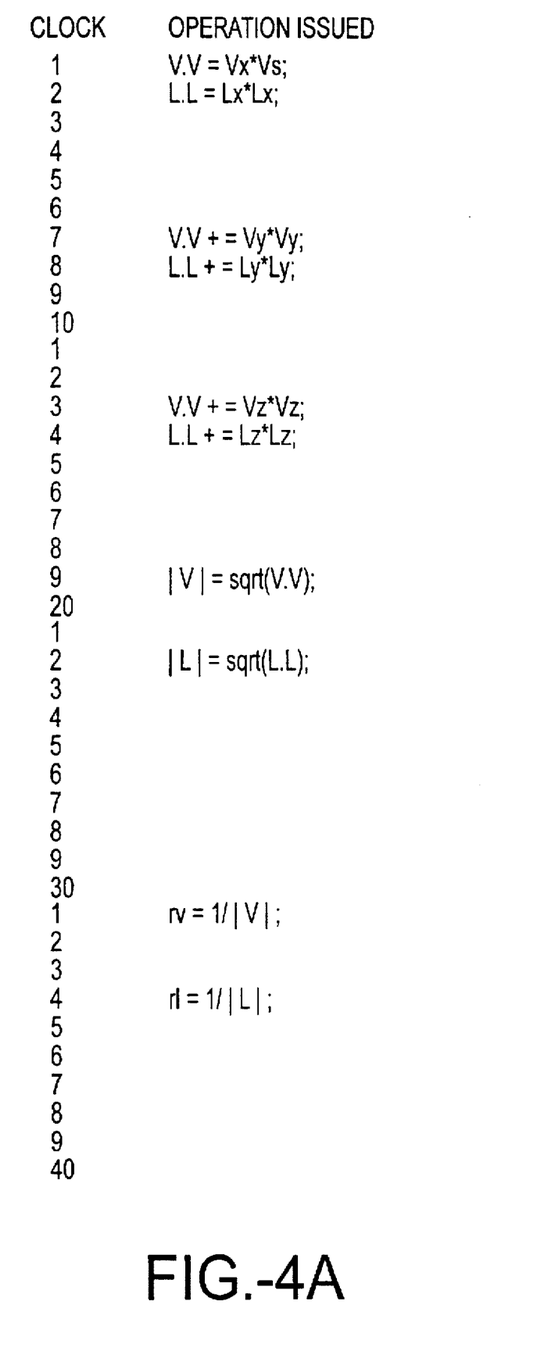
FIGS. 4A, 4B and 4C show the operation sequence of the conventional technology for generating L1.N1 and H1.N1, where the left hand column indicates the clock cycle, and the right hand column indicates the issued operation.
Figure 4B:
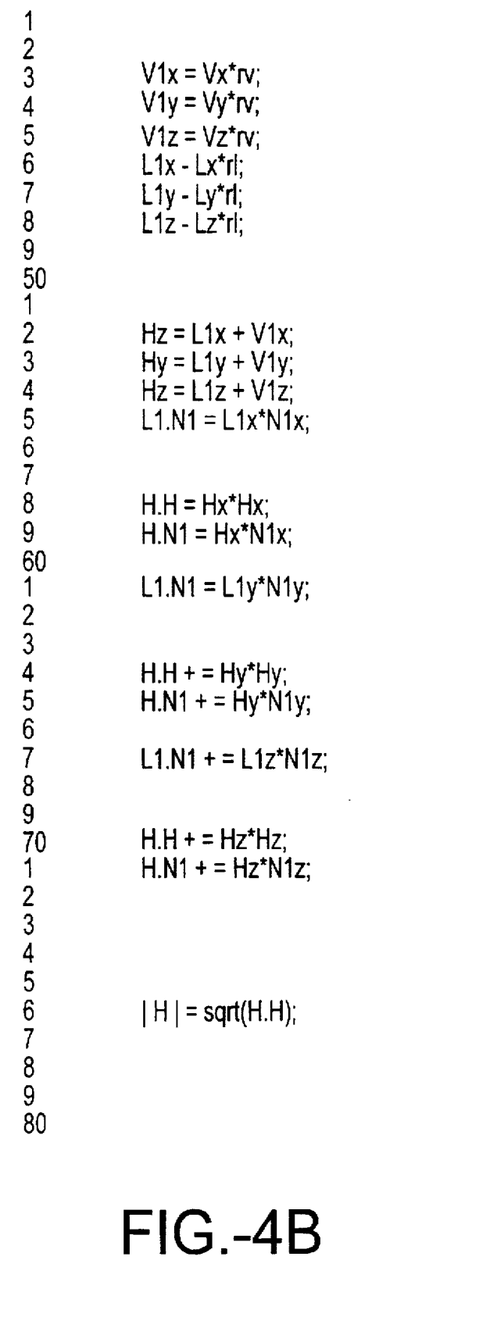
Figure 4C:
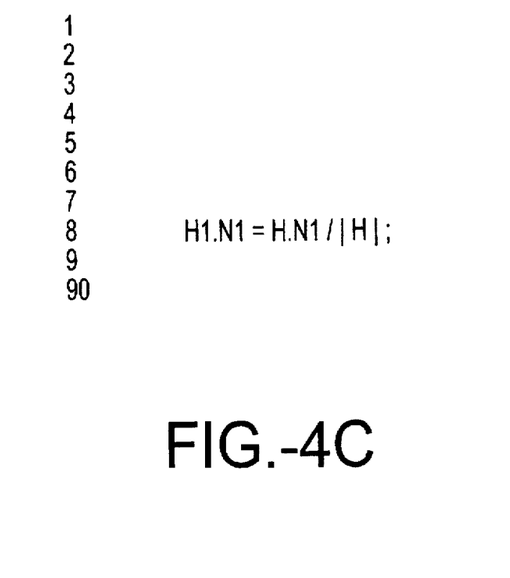
Figure 5:
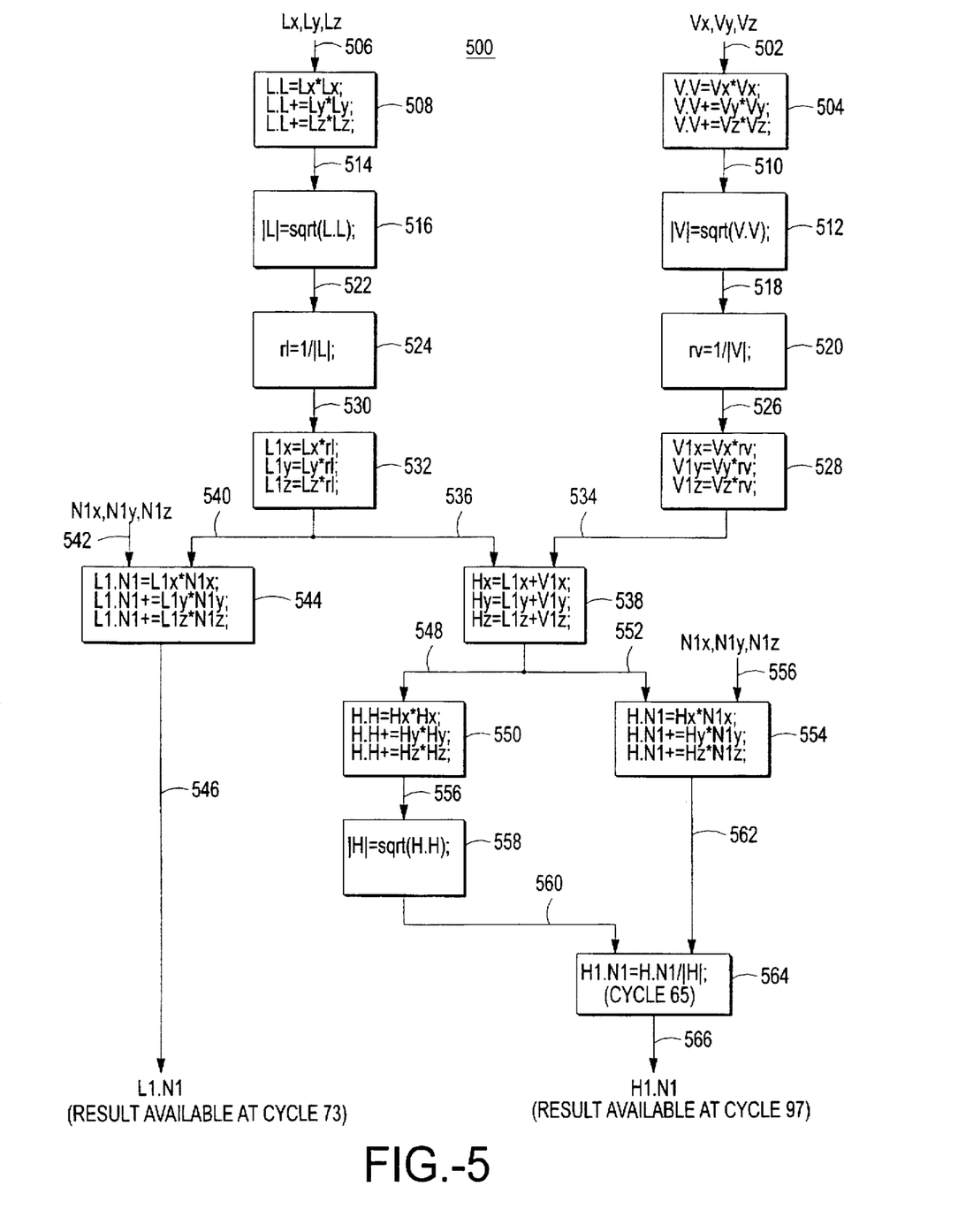
FIG. 5 is a data flow showing the flow of data, the operations, and the required instruction, for the computation to produce L1.N1 and H1.N1 in accordance with the conventional technology.

In FIG. 5, each block lists the instructions to be performed. Referring to the operation sequence samples of FIGS. 4–7 the symbols (Lx, Ly, Lz) are the coordinates of the light direct vector L. Similar notation is used for V, H, L1, V1, H1, and N1. The symbols "+=" and "*=" are accumulating operations, e.g., L.L+=Ly*Ly means new L.L is equal to original L.L plus Ly*Ly. It should be noticed that the dot product of 2 vectors cannot be issued in fewer than 13 cycles because of data dependence and execution latency. It should also be noticed that H=L1+V1 can be started right after L1x and V1x are completed. The conventions described below are shown in FIG. 2B illustrating inputs and outputs for processors 204, 206, 208, 210. Increased throughput characteristics for dot product processor 206 will be shown by comparing the conventional approach with the present invention (both described in detail below).

The invention is also suitable in the case that there are two or more local lights and/or spot lights. For simplicity, only one local light is assumed in the explanation and the examples.

2.0 Conventional Approach

The conventional dot-product process for determining L1.N1 and H1.N1 is now described. The operations according to the conventional approach cannot be completely issued in fewer than 85 cycles using the processor 300 of FIG. 3 due to latency assumptions and functions, as described below. FIG. 4 shows the operation sequence in accordance with the conventional approach, where the left column indicates the clock cycle, and the right column indicates the instruction issued. FIG. 5 shows the data flow for the conventional approach, where the blocks indicate the computation (instruction issued).

Referring now to FIGS. 3, 4 and 5, the data flow of the conventional approach is indicated by a reference number 500. As indicated in FIG. 5, a path 502 supplies Vx, Vy, and Vz signals. Referring to FIG. 3 these signals are input from the input queue 301 and stored in the register file 304. As shown in FIG. 5, in a first data stage the V.V and L.L signals are determined in blocks 504 and 508. It should be noted that operations in a data stage may be performed in any order. Thus the operations that occur in block 508 could be performed before block 504 or vice versa. As indicated by a block 504, in clock cycle 1, the operation issued is V.V=Vx*Vx.

A path 506 provides Lx, Ly, and Lz signals. A block 508 computes L.L=Lx.Lx, and the operation is issued in a clock cycle 2.

In a clock cycle 7, the operation issued is V.V+=Vy*Vy. This is indicated by block 504. Note, as discussed above, the notation used here of "+=" indicates an accumulating operation, where V.V+=Vy*Vy is equal to the original V.V plus Vy*Vy and could be written as V.V=Vy*Vy+V.V.

In a clock cycle 8, the operation issued is L.L+=Ly*Ly, as indicated by block 508.

In a clock cycle 13, the operation issued is V.V+=Vz*Vz, as indicated by block 504. Note that the earliest that V.V can be issued is in clock cycle 13.

Figure 6A:
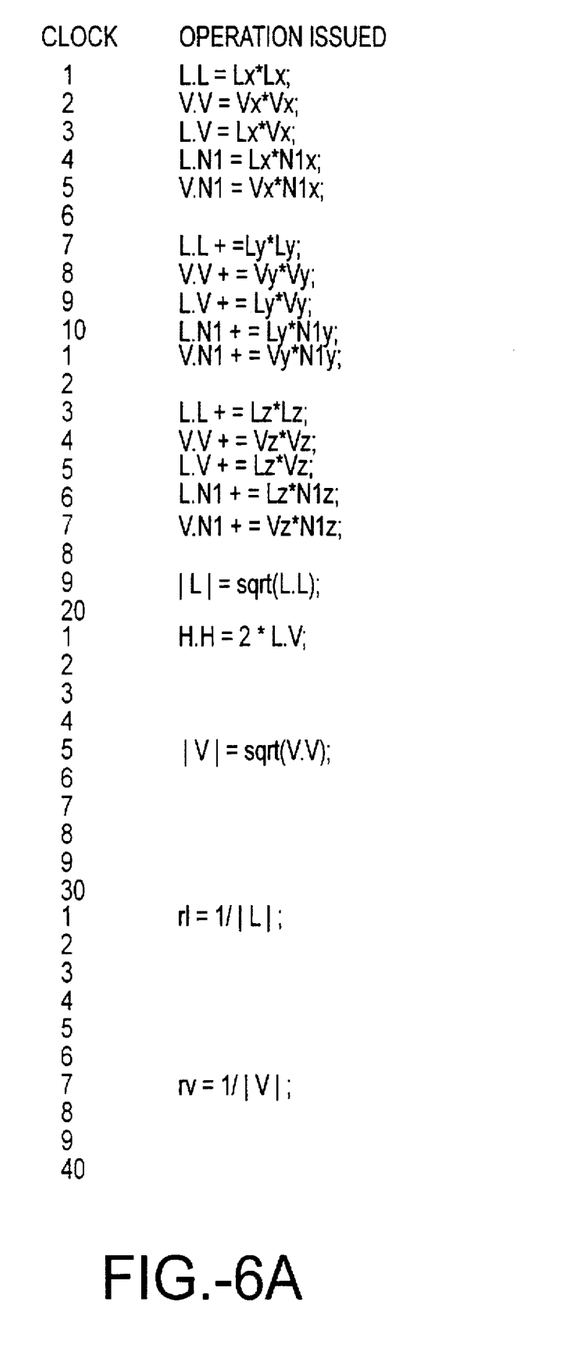
FIGS. 6A and 6B show the operation sequence-process for producing L1.N1 and H1.N1 in accordance with the present invention, where the left hand column indicates the clock cycle, and the right hand column indicates the issued operation.

In clock cycle 14, the operation issued is L.L+=Lz*Lz, as indicated by block 508. Note that the earliest that L.L signal can be issued is in clock cycle 14. FIG. 6A indicates that this operation is issued in cycle 13, whereas the sample of operations sequence indicates that this is first issued in clock cycle 14. This means that if block 508 was performed before block 504 the earliest the clock sequence could be performed is clock cycle 13.

The V.V result from block 504 is provided by a path 510 to a block 512. In block 512, the signal for |V| is calculated. This signal is equal to sqrt(V.V). This operation is issued in clock cycle 19. The |V| signal is a scaler value indicative of the magnitude of the V vector.

The computed signal for L.L from block 508 is provided by a path 514 to a block 516, which calculates the signal for |L|. The operation issued in block 516 is |L|=sqrt(L.L), which occurs in clock cycle 22. The signal |V| from block 512 is provided by a path 518 to a block 520. In block 520, the operation issued is rv=1/|V|, which occurs in clock cycle 31. The signal rv refers to temporary registers in register file 304. There may be any number of temporary register files in register file 304.

The magnitude of the light direction vector |L| signal from block 516 is provided by a path 522 to a block 524. In block 524, the operation issued is r1=1/|L| which occurs in clock cycle 34. The signal r1 refers to a temporary register in register file 304. The unit vector V1 in the x, y and z coordinates is now calculated in a block 528, which obtains the signal of rv from block 520 via a path 526. In a cycle 43, the operation issued is V1x=Vx*rv. In clock cycle 44, the operation issued is V1y=Vy*rv. In clock cycle 45, the operation issued is V1z=Vz*rv.

In a block 532, the unit vector L1, which points from the object to the position L of the local light source, is calculated for the x, y, and z coordinates. The signal r1 is supplied by block 524 via a path 530 to block 532. The operation issued in clock cycle 46 is L1x=Lx*r1. The operation issued in clock cycle 47 is L1y=Ly*r1. The operation issued in clock cycle 48 is L1z=Lz*r1.

As stated above, the H vector is the half angle vector between L and V. The x, y, and z coordinate signals of the H vector are calculated in a block 538. The V1 x, y, and z signals are supplied by block 528 to block 538 by a path 534. Similarly, the L1 x, y, and z signals are supplied by block 532 to block 538 via a path 536.

In block 538, the operation issued in clock cycle 52 is Hx=L1x+V1x. In clock cycle 53, the operation issued is Hy=L1y+V1y. In clock cycle 54, the operation issued is Hz=L1z+V1z.

In a block 544, the signal for L1.N1 is issued. The L1 x, y, and z signals are supplied by block 532 to block 544 via a path 540. The N1x, N1y, and N1z signals are supplied by a path 542 to block 544. In block 544, in clock cycle 55, the operation issued is L1.N1=L1x*N1x. In a clock cycle 61, the operation issued is L1.N1+=L1y*N1y. In a clock cycle 67, the operation issued is L1.N1+=L1z*N1z. Thus, it can be seen that in clock 67, the needed signal of L1.N1 has been issued by block 544 on a line 546.

However, the needed H1.N1 signal has not yet been issued. It will not be issued until clock cycle 88 as described below.

The H.H result is calculated in a block 550. The H x, y, and z signals are supplied by block 538 to block 550 by a path 548. In block 550, in a clock cycle 58, the operation issued is H.H=Hx*Hx. In a clock cycle 64, the operation issued is H.H+=Hy*Hy. In a clock cycle 70, the operation issued is H.H+=Hz*Hz.

The H.N1 is calculated in a block 554. The H x, y, and z signals are supplied by block 538 to block 554 via a path 552. In addition, the N1x, N1y, and N1z signals are supplied by a path 556 to block 554.

In block 554, the operation issued is H.N1=Hx*N1x. In a clock cycle 65, the operation issued is H.N1+=Hy*N1y. In a clock cycle 71, the operation issued is H.N1+=Hz*N1z.

The |H| result is issued in a block 558. Block 550 provides the H.H signal to block 558 by a path 556. In clock cycle 76, the operation issued is |H|=sqrt(H.H).

The H1.N1 signal is calculated in a block 564. The |H| signal is supplied by block 558 to block 564 by a line 560. The H.N1 signal is supplied by block 554 to block 564 via a path 562. In a clock cycle 88, the operation issued is H1.N1=H.N1/|H|.

The result H1.N1 is supplied on a line 566 by block 564. This result is available at cycle 97.

Thus, it can be seen that the needed L1.N1 and the H1.N1 signals are not available until cycle 96 using the conventional approach. As will be shown below, the present invention significantly reduces the number of clock cycles that are required to produce these desired results.

3.0 Single Local Light Source Embodiment

The single local light source embodiment of the present invention produces colored light in 79 cycles as opposed to the 97 cycles required by the conventional approach. This results in a 22.7% increase in time efficiency.

According to the present invention the crucial light signals L1.N1 and H1.N1, of equation 1 are generated by processing instructions for determining the half angle vector H.H into a number of intermediate instructions. In other words, the instruction for determining the dot product of the half angle vector potentially starts in a machine cycle 19. Whereas in the conventional techniques the dot product of the half angle vector is not started until machine cycle 58.

Figure 6B:
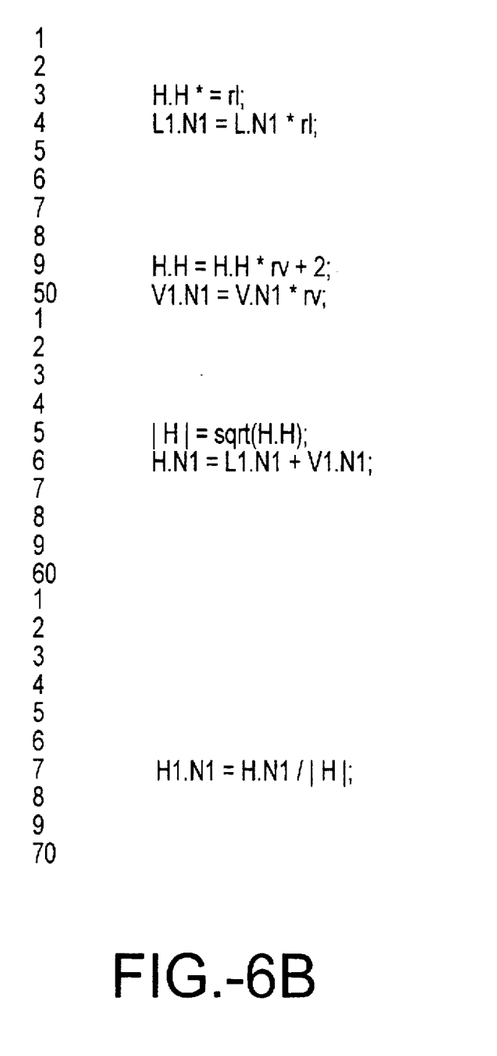
Figure 7:
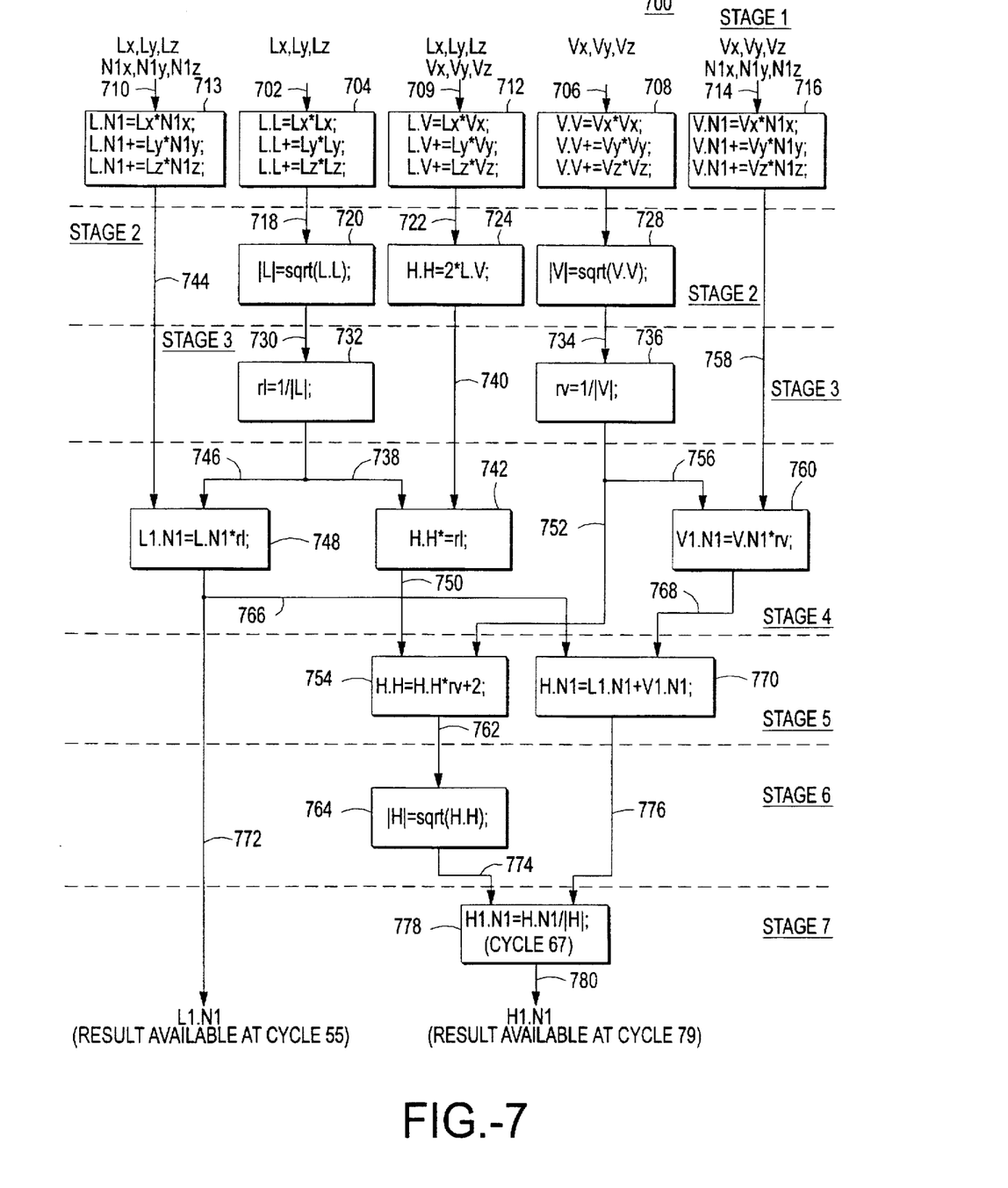
FIG. 7 is a data flow showing the flow of data, the operations, and the required instructions to produce L1.N1 and H1.N1 in accordance with the present invention.

The structure and operation of the present invention are now discussed with reference to FIGS. 2, 3, 6A, 6B and 7. FIGS. 6A and 6B show the sample operational sequence of this embodiment, where the clock cycles are indicated in the left column, and the instructions issued are indicated in the right column. FIG. 7 is a chart showing the data flow of this embodiment. FIG. 7 is broken down into seven cycle stages. Each cycle is comprised of functional blocks. For discussion purposes each stage will be separately discussed.

Referring now to FIGS. 6 and 7, the data flow for this embodiment is indicated generally by the reference numeral 700. It should be noted that any equations written in FIGS. 6A and 6B do not necessarily need to be performed in the exact order shown, but may be performed at times referenced by FIG. 7. For example, referring to the data flow of FIG. 7, all operations within blocks 704, 708, 712, 713, and 716 (the first processing or data stage) may be performed interchangeably. Thus, referring to FIG. 6, on clock cycle 1 instead of instruction L.L=Lx*Lx being issued by controller 302 the instruction of V.V=Vx*Vx could be issued. In other words, as will become apparent to those skilled in the art, the actual order of operation sequences may be altered with equivalent operations. The instruction for producing the x component for the dot product of the light direction vector could easily be switched with the issuance of an instruction of the x component for the dot product of the view direction vector, etc.

The grouping of blocks in stages according to FIG. 7 is important. The exact order of computations within each box and the exact order of when each block is performed in FIG. 6 is not critical. As long as the stages are performed in this format the color will be issued in clock 67.

The production of 3D color images according to the present invention is performed by graphics system 201. In particular, dot product processor 206 performs the time critical processing that enables color images to be displayed faster than conventional methods. Controller 302 manages the flow of data for processor 206. Control of the processor 206 generally occurs as follows: Signals representing light direction, view direction and a unit normal vector enter input queue 301. Referring to FIG. 7 these signals are shown above the first data stage as 702, 706, 709, 710 and 714. These signals are then written into register file 304 at assigned locations. After being written into the register file 304, signals 702, 706, 709, 710 and 714 are sent to FMAC 342 for computation according to instructions issued by controller 302. Once FMAC 342 performs the requested computation it is either written back to register file 304 (at a location destination, i.e. L.L shown in FIGS. 6 and 7), or reused immediately in a next clock cycle via bypass latch 348.

Referring now to FIGS. 6 and 7, in a first data stage, five dot product signals are computed and stored in conjunction with system 300 described above. In block 713, the light direction vector is dotted with the unit normal vector and the resulting signal is stored in register file 304. In block 702, the light direction vector dot product is computed and stored. In block 712, the light direction vector dotted with the view direction vector and the resulting signal is stored. In block 708, the view direction vector dot product is computed and stored. In block 716 the view direction vector is dotted with the unit normal vector and stored. The operations occurring in each block will now be described in more detail.

The dot Lx, Ly, and Lz signals are supplied by a path 702 to a block 704, which calculates the result of L.L. In a clock cycle 1, the operation issued is L.L=Lx*Lx. In a clock cycle 7, the operation issued is L.L+=Ly*Ly. In a clock cycle 13, the operation issued is L.L+=Lz*Lz. Thus, the result L.L is available in clock cycle 13.

The result V.V is calculated in a block 708. The signals Vx, Vy, and Vz are provided to block 708 by a path 706. In block 708, the operation issued in clock cycle 2 is V.V= Vx*Vx. In a clock cycle 8, the operation issued is V.V+= Vy*Vy. In a clock cycle 14, the operation issued is V.V+= Vz*Vz.

The result L.V is calculated in a block 712. The signals Lx, Ly, Lz, Vx, Vy, and Vz are supplied to block 712 by a path 710. In block 712, the operation issued L.V=Lx*Vx occurs in clock cycle 3. In clock cycle 9, the operation issued is L.V+=Ly*Vy. In clock cycle 15, the operation issued is L.V+=Lz*Vz.

The result L.N1 is calculated in a block 713. The signals Lx, Ly, Lz, N1x, N1y, and N1z are supplied by a path 710 to block 712. In block 712, in clock cycle 4, the operation issued is L.N1=Lx*N1x. In a clock cycle 10, the operation issued is L.N1+=Ly*N1y. In a clock cycle 16, the operation issued is L.N1+=Lz*N1z.

The signal V1.N1 is calculated in a block 716. The signals Vx, Vy, Vz, N1x, N1y, and N1z are supplied via a path 714 to block 716. In clock cycle 5, the operation issued is V.N1=Vx*N1x. In clock cycle 11, the operation issued is V.N1+=Vy*N1y. In a clock cycle 17, the operation issued is V1.N1+=Vz*N1z.

In a second data stage, determining and storing three portions of light occurs in accordance with signals obtained in the first data stage. In block 720 the magnitude of the light direction vector is computed. In block 728, the magnitude of the view direction vector is computed. In block 724, a first partial result of the half angle dot product is computed. The exact order of computations is flexible. The detail of the second data stage will now be described in more detail.

The signal |L| is calculated in a block 720. The result L.L is provided by block 704 to block 720 via a path 718. In clock cycle 19, the operation issued is |L|=sqrt(L.L). The |L| signal is the scaler signal of the length of the L vector which points from the object to the local light source.

The result H.H is calculated in a block 724. The result L.V is provided by block 712 to block 724 via a path 722. In block 724, in a cycle 21, the operation issued is H.H=2*L.V.

The |V| is calculated in a block 728. The |V| signal is the scaler signal of the length of the V vector which points from the object to the viewer. In a clock cycle 25, the operation issued is |V|=sqrt(V.V).

In a third data cycle stage, determining and storing two portions of light according to signals from the first and second pipeline stages is accomplished. In block 732 the inverse magnitude of the light direction vector is calculated and stored. In block 736, the inverse magnitude of the view direction vector is calculated and stored. The exact order of producing signals within this pipeline is interchangeable. The example order of producing instruction signals will now be described in more detail with reference to FIG. 5.

The signal r1 is produced in a block 732. The signal |L| is supplied by block 720 to block 732 by a path 730. In a clock cycle 31, the operation issued is r1=1/|L|. As explained above r1 stands for a temporary register located in register file 304.

The desired rv signal is produced in a block 736. The |V| result is supplied by block 728 to block 736 by a path 734. In a clock cycle 37, the operation issued is rv=1/|V|.

In a fourth data stage, determining and storing 3 portions of light according the three previous data stages is accomplished. In a block 742, a second partial result of the half angle vector dot product is produced and stored. In a block 748, the final result of the light direction unit vector dotted with the unit normal vector is determined and stored. In a block 760, the view direction unit vector dotted with the unit normal vector is produced and stored. The fourth data cycle stage will now be described in more detail.

The desired result H.H is produced in a block 742. The r1 signal is supplied by block 732 to block 742 by a path 738. The H.H signal is supplied by block 724 to block 742 by a path 740. In a clock cycle 43, the operation issued is H.H*=r1.

The L1.N1 result is produced in a block 748. The L.N1 result is supplied by block 712 to block 748 by a path 744. The r1 signal is supplied by block 732 to block 748 by a path 746. In a clock cycle 44, the operation issued is L1.N1= L.N1*r1.

The V1.N1 signal is determined in a block 760. The rv signal is provided by block 736 to block 760 by a path 756. The V.N1 signal is provided by block 716 to block 760 by a path 758. In a clock cycle 50, the operation issued is V1.N1=V.N1*rv.

In a fifth data cycle stage, determining and storing two portions of light according to the four previous data stages is accomplished in accordance with the system of FIG. 2. In a block 754, the final result of the half angle vector dot product is determined and stored. In a block 770, the result of half angle vector dotted with the unit normal vector (the spectral light source reflection coefficient) is produced and stored. The operation of the fifth data stage will now be described in more detail.

The H.H signal is provided in a block 754. The H.H signal on the left hand side of the equation is supplied by block 742 to block 754 via a path 750. The rv signal is supplied by block 736 to block 754 by a path 752. In a clock cycle 49, the operation issued is H.H=H.H*rv+2.

The H.N1 signal is determined in a block 770. The L1.N1 signal is supplied by block 748 to block 770 by a path 766. The signal V1.N1 is supplied by a block 760 to block 770 by a path 768. In a clock cycle 56, the operation issued is H.N1=L1.N1+V1.N1.

In a sixth data stage, the magnitude of the half angle according to the five previous data stages is accomplished. The |H| signal is determined in a block 764. The H.H signal is provided by block 754 to block 764 by a path 762. In a clock cycle 55, the operation issued is |H|=sqrt(H.H).

In a seventh and final data stage, the half angle unit vector is dotted with unit normal vector. The signal H1.N1 is produced in a block 778. The signal |H| is provided by block 764 to block 778 by a path 774. The signal H.N1 is provided by block 770 to block 778 by a path 776. In block 778, in a clock cycle 67, the operation issued is H1.N1=H.N1/|H|.

The result H1.N1 is available at cycle 79, and is provided by block 778 on a path 780.

Thus, it is seen that the desired results of L1.N1 and H1.N1 are available by cycle 79. This results in a better than 22% reduction in the number of cycles required to produce these two desired results, as compared to the conventional approach.

It is thus seen that this embodiment of the present invention provides a very significant reduction in the amount of computation time required to produce the results of L1.N1 and H1.N1.

The present invention has been described in its various aspects and embodiments. As can be appreciated, there are many versions of it that can be utilized that are with in its spirit and scope. Consequently, the present invention should not be limited except by the claims which follow.

What is claimed is:

1. A system for generating three-dimensional (3D) color images with simulated light sources, comprising:

means for receiving input signals representing a light direction vector, view direction vector and a normal vector;

register means coupled to said means for receiving, for storing said input signals in a data format;

a floating point multiplier and accumulator (FMAC);

control means for generating: (a) a first set of instruction signals for
  (1) transferring said input signals from said register means to said FMAC,
  (2) for instructing said FMAC to perform five dot product operations on said input signals, wherein said five dot product operations are started in a first latency period and comprise:
    (i) the light direction vector dotted with the normal vector,
    (ii) the light direction vector dotted with itself,
    (iii) the light direction vector dotted with the view direction vector,
    (iv) the view direction vector dotted with itself, and
    (v) the view direction vector dotted with the normal vector,
  (3) and for storing results of said five dot product operations in said register means;

(b) a second set of instruction signals using the stored results of said five dot product operations, said second set of instruction signals comprising instructions for performing:
  (1) the magnitude of the light direction vector,
  (2) the magnitude of the view direction vector, and
  (3) a first partial result of a half angle dot product, wherein said first partial result includes the dot product of the light direction vector and the view direction vector, and for storing the results of said second set of instruction signals in said register means;

(c) a third set of instruction signals using the results obtained from the operation of said first and second sets of instructions, said third set of instructions comprising instructions for performing: a third operation of determining (1) the inverse magnitude of the light direction vector, and (2) the inverse magnitude of the view direction vector, and for storing the results of said third operation in said register means;

(d) a fourth set of instruction signals using the results obtained from the operation of said first through third sets of instruction signals, said fourth set of instructions comprising instructions for performing a fourth operation of determining (1) a second partial result of the half angle dot product, (2) the light direction vector dotted with the normal vector, and (3) the view direction vector dotted with the normal vector, and for storing the results of said fourth operation in said register means;

(e) a fifth set of instruction signals using the results obtained from the operation of said first through fourth sets of instructions, said fifth set of instruction signals comprising instructions for performing: a fifth operation of determining (1) the final result of the half angle dot product, and (2) the result of the half angle vector dotted with the normal vector, and for storing the results of said fifth operation in said register means;

(f) a sixth set of instruction signals using the results obtained from said first through fifth sets of instruction signals, said sixth set of instruction signals comprising instructions for performing a sixth operation of determining the magnitude of the half angle and for storing the results of said sixth operation; and (g) a seventh set of instruction signals using the results obtained from the operation of said first through sixth sets of instruction signals, said seventh set of instruction signals comprising instructions for performing a seventh operation of determining the half angle unit vector dotted with the normal vector and for storing the results of said seventh operation in said register means.

2. The system of claim 1, further comprising a final lighting means, coupled to said register means, for receiving a first signal indicating the results of said seventh operation and a second signal indicating the results of the light direction unit vector dotted with the normal vector, and for producing red, green and blue signals.

3. A method for generating three-dimensional (3D) color images with simulated light sources, comprising:

inputting data signals representing light direction, view direction and a normal vector to a register;

generating a first set of instruction signals for transferring said data from said register to a floating point multiplier and accumulator (FMAC), for instructing said FMAC to perform five dot product operations on said data, wherein said dot product operations are started in a first latency period and comprise (1) a light direction vector dotted with the normal vector, (2) the light direction vector dotted with itself, (3) the light direction vector dotted with a view direction vector, (4) the view direction vector dotted with itself, and (5) the view direction vector dotted with the normal vector, and for storing the results of said five dot product operations;

generating a second set of instructions in accordance with the stored results of said five dot product operations, said second set of instructions comprising instructions for performing a second operation of determining (1) the magnitude of the light direction vector, (2) the magnitude of the view direction vector, and (3) a partial result of a half angle dot product, and for storing the results of said second operation;

generating a third set of instructions in accordance with the results obtained from the operation of said first and second sets of instructions, said third set of instructions comprising instructions for performing a third operation of determining (1) the inverse magnitude of the light direction vector, and (2) the inverse magnitude of the view direction vector, and for storing the results of said third operation;

generating a fourth set of instructions in accordance with the results obtained from the operation of said first through third sets of instructions, said fourth set of instructions comprising instructions for performing a fourth operation of determining (1) a second partial result of the half angle dot product, (2) the light direction unit vector dotted with the normal vector, and (3) the view direction unit vector dotted with the normal vector, and for storing the results of said fourth operation;

generating a fifth set of instructions in accordance with the results obtained from the operation of said first through fourth sets of instructions, said fifth set of instructions comprising instructions for performing a fifth operation of determining (1) the final result of the half angle dot product, and (2) the result of the half angle vector dotted with the normal vector, and for storing the results of said fifth operation;

generating a sixth set of instructions in accordance with the results obtained from the operation of said first through fifth sets of instructions, said sixth set of instructions comprising instructions for performing a sixth operation of determining the magnitude of the half angle and for storing the results of said sixth operation; and generating a seventh set of instructions in accordance with the results obtained from the operation of said first through sixth sets of instructions, said seventh set of instructions comprising instructions for performing a seventh operation of determining the half angle unit vector dotted with the normal vector and for storing the results of said seventh operation.

4. A computer system for generating three-dimensional color images based on user-defined positions of simulated light sources, comprising:

a pipelined processor that includes:

a register file for storing light signal parameters that include a light direction vector, a normal vector and a view direction vector;

a plurality of multiplexers, each of said plurality of multiplexers having inputs that receive one of said light signal parameters from said register file;

a floating point multiplier and accumulator unit that selectively receives said light signal parameters from said plurality of multiplexers at input ports A, B and C, said floating point multiplier and accumulator unit having a latency of N cycles for completion of an (A*B)+C operation, wherein said N cycles define a latency period; and a controller coupled to said register file, said plurality of multiplexers and said floating point multiplier and accumulator, said controller instructing said floating point multiplier and accumulator unit to start, within a first latency period, a set of five of said (A*B)+C operations that include:

said light direction vector dotted with the normal vector, said light direction vector dotted with said light direction vector, said light direction vector dotted with said view direction vector, said view direction vector dotted with said view direction vector, and said view direction vector dotted with said normal vector, the results of each of said set of five operations being used in subsequent latency periods to produce vector dot products L1.N1 and H1.N1, said vector dot products L1.N1 and H1.N1 being used in a lighting equation to generate three-dimensional color images based on user-defined positions of simulated light sources.

5. The computer system of claim 4, further comprising a final lighting means that causes a video screen to display surface illumination resulting from the effect of the simulated light sources at the user-defined positions.

6. A method for generating three-dimensional color images based on user-defined positions of simulated light sources, comprising the steps of:

(1) storing light signal parameters in a register file, wherein said light signal parameters include a light direction vector, a normal vector and a view direction vector;

(2) selecting said light signal parameters stored in said register file as inputs to input ports A, B and C of a floating point multiplier and accumulator unit, wherein said floating point multiplier and accumulator has a latency of N cycles for completion of an (A*B)+C operation and said N cycles define a latency period;

(3) starting, within a first latency period, five of said (A*B)+C operation including:
  said light direction vector dotted with the normal vector,
  said light direction vector dotted with said light direction vector,
  said light direction vector dotted with said view direction vector,
  said view direction vector dotted with said view direction vector, and
  said view direction vector dotted with said normal vector; and (4) using the results of each of said five operations started in step (3) in subsequent latency periods to produce vector dot products L1.N1 and H1.N1, said vector dot products L1.N1 and H1.N1 being used in a lighting equation to generate three-dimensional color images based on user-defined positions of simulated light sources.

7. The method of claim 6, further comprising the step of displaying, on a video screen, surface illumination resulting from the effect of the simulated light sources at the user-defined positions.

8. In a computer system for generating three-dimensional color images using the basic lighting equation, $C_i = Ca_i + Cd_i |Lc_i(L1.N1)| + Cs_i |Lc_i(H1.N1)^{Oe}|$ that utilizes user-defined position information of simulated light sources, wherein the computer system comprises a floating point multiplier and accumulator unit that receives light signal parameters at input ports A, B and C, the floating point multiplier and accumulator unit having a latency of at least five cycles for completion of an (A*B)+C operation, a control means for instructing the floating point multiplier and accumulator unit to perform calculations, comprising:

a first means for instructing the floating point multiplier and accumulator unit to begin calculating in a first latency period in an arbitrary order, $L.L = L_x * L_x$, $V.V = V_x * V_x$, $L.V = L_x * V_x$, $L.N1 = L_x * N1_x$, and $V.N1 = V_x * N1_x$;

a second means for instructing the floating point multiplier and accumulator unit to begin calculating in a second latency period in an order corresponding to said arbitrary order of said first latency period, $L.L + = L_y * L_y$, $V.V + = V_y * V_y$, $L.V + = L_y * V_y$, $L.N1 + = L_y * N1_y$, and $V.N1 + = V_y * N1_y$;

and a third means for instructing the floating point multiplier and accumulator unit to begin calculating in a third latency period in an order corresponding to said arbitrary order of said first latency period, $L.L + = L_z * L_z$, $V.V + = V_z * V_z$, $L.V + = L_z * V_z$, $L.N1 + = L_z * N1_z$, and $V.N1 + = V_z * N1_z$, wherein said second latency period follows said first latency period and said third latency period follows said second latency period, wherein each of the results L.L, V.V, L.V, L.N1 and V.N1 of said third latency period are used in subsequent latency periods to produce vector dot products L1.N1 and H1.N1, said vector dot products L1.N1 and H1.N1 being used in the basic lighting equation $C_i = Ca_i + Cd_i (Lc_i(L1.N1)) + Cs_i(Lc_i(H1.N1)^{Oe})$, to generate three-dimensional color images based on user-defined positions of simulated light sources.

9. The system of claim 8, wherein the control logic further comprises fourth means for instructing the floating point multiplier and accumulator unit to begin calculating, after the completion of said third latency period, the following:

a first set of calculations, comprising:

$|L| = \operatorname{sqrt}(L.L)$, $|V| = \operatorname{sqrt}(V.V)$, and $T_1 = 2 * L.V$;

a second set of calculations, comprising:

$rl = 1/|L|$, and $rv = 1/|V|$;

a third set of calculations, comprising:

$T_2 = T_1 * rl$, $L1.N1 = L.N1 * rl$, and $V1.N1 = V.N1 * rv$;

a fourth set of calculations, comprising:

$H.H = T_2 * rv + 2$, and $H.N1 = L1.N1 + V1.N1$;

a fifth set of calculations, comprising:

$|H| = \operatorname{sqrt}(H.H)$; and a sixth set of calculations, comprising:

$H1.N1 = H.N1/|H|$.

10. The system of claim 8, further comprising final lighting means that causes a video screen to display surface illumination resulting from the effect of the simulated light sources at the user-defined positions.

11. A method for generating three dimensional color images using a floating point multiplier and accumulator unit to implement the basic lighting equation, $C_i=Ca_i+Cd_i(Lc_i(L1.N1))+Cs_i(Lc_i(H1.N1)^{Oe})$ that utilizes user-defined position information of simulated light sources, said floating point multiplier and accumulator unit receiving light signal parameters at input ports A, B and C and having a latency of at least five cycles for completion of an (A*B)+C operation, wherein said N cycles define a latency period, the method comprising the steps of:

(1) in a first latency period, starting in an arbitrary order, the operations, $L.L=L_x*L_x$, $V.V=V_x*V_x$, $L.V=L_x*V_x$, $L.N1=L_x*N1_x$, and $V.N1=V_x*N1_x$;

(2) in a second latency period immediately following said first latency period, starting in an order corresponding to said arbitrary order of said first latency period, the operations, $L.L+=L_y*L_y$, $V.V+=V_y*V_y$, $L.V+=L_y*V_y$, $L.N1+=L_y*N1_y$, and $V.N1+=V_y*N1_y$;

(3) and in a third latency period immediately following said second latency period, starting in an order corresponding to said arbitrary order of said first latency period, the operations, $L.L+=L_z*L_z$, $V.V+=V_z*V_z$, $L.V+=L_z*V_z$, $L.N1+=L_z*N1_z$, and $V.N1+=V_z*N1_z$; and (4) using each of the results L.L, V.V, L.V, L.N1 and V.N1 of said third latency period in subsequent latency periods to produce vector dot products L1.N1 and H1.N1, said vector dot products L1.N1 and H1.N1 being used in the basic lighting equation, $C_i=Ca_i+Cd_i(Lc_i(L1.N1))+Cs_i(Lc_i(H1.N1)^{Oe})$, to generate three-dimensional color images based on user-defined positions of simulated light sources.

12. The method of claim 11, further comprising the step of calculating, after the completion of said third latency period, the following:

a first set of calculations, comprising:

$|L|=sqrt(L.L)$, $|V|=sqrt(V.V)$, and $T_1=2*L.V$;

a second set of calculations, comprising:

$r1=1/|L|$, and $rv=1/|V|$;

a third set of calculations, comprising:

$T_2=T_1*r1$, $L1.N1=L.N1*r1$, and $V1.N1=V.N1*rv$;

a fourth set of calculations, comprising:

$H.H=T_2*rv+2$, and $H.N1=L1.N1+V1.N1$;

a fifth set of calculations, comprising:

$|H|=sqrt(H.H)$; and a sixth set of calculations, comprising:

$H1.N1=H.N1/|H|$.

13. The method of claim 11, further comprising the step of displaying, on a video screen, surface illumination resulting from the effect of the simulated light sources at the user-defined positions.

14. A computer program product for use with a computer system, said computer program product comprising:

a computer usable medium having computer readable program code means embodied in said medium for causing the computer system to generate three-dimensional color images based on user-defined positions of simulated light sources, said computer readable program code means comprising:

first computer readable program code means for enabling the computer system to store light signal parameters in a register file, wherein said light signal parameters include a light direction vector, a normal vector and a view direction vector;

second computer readable program code means for enabling the computer system to select said light signal parameters stored in said register file as inputs to input ports A, B and C of a floating point multiplier and accumulator unit, wherein said floating point multiplier and accumulator has a latency of N cycles for completion of an (A*B)+C operation and said N cycles define a latency period;

third computer readable program code means for enabling the computer system to start, within a first latency period, five of said (A*B)+C operations including:

said light direction vector dotted with the normal vector, said light direction vector dotted with said light direction vector, said light direction vector dotted with said view direction vector, said view direction vector dotted with said view direction vector, and said view direction vector dotted with said normal vector; and fourth computer readable program code means for enabling the computer system to use the results of each of said five operations in subsequent latency periods to produce vector dot products L1.N1 and H1.N1, said vector dot products L1.N1 and H1.N1 being used in a lighting equation to generate three-dimensional color images based on user-defined positions of simulated light sources.

15. The computer program product of claim 14, further comprising computer readable program code means for enabling the computer system to display, on a video screen, surface illumination resulting from the effect of the simulated light sources at the user-defined positions.

16. The computer program product of claim 14, wherein said fourth computer readable program code means comprises computer readable program code means for enabling the computer system to calculate:

a first set of calculations, comprising:

$|L|=sqrt(L.L)$, $|V|=sqrt(V.V)$, and $T_1=2*L.V$;

a second set of calculations, comprising:

$rl=1/|L|$, and $rv=1/|V|$;

a third set of calculations, comprising:

$T_2=T_1*rl$, $L1.N1=L.N1*rl$, and $V1.N1=V.N1*rv$;

a fourth set of calculations, comprising:

$H.H=T_2*rv+2$, and $H.N1=L1.N1+V1.N1$;

a fifth set of calculations, comprising:

$|H|=sqrt(H.H)$; and a sixth set of calculations, comprising:

$H1.N1=H.N1/|H|$.

17. The computer program product of claim 14, wherein said lighting equation is of the form $C_i=Ca_i+Cd_i(Lc_i(L1.N1))+Cs_i(Lc_i(H1.N1)^{Oe})$.

18. A system for generating three-dimensional color images based on user-defined positions of simulated light sources, comprising the steps of:

(1) means for storing light signal parameters in a register file, wherein said light signal parameters include a light direction vector, a normal vector and a view direction vector;

(2) means for selecting said light signal parameters stored in said register file as inputs to input ports A, B and C of a floating point multiplier and accumulator unit, wherein said floating point multiplier and accumulator has a latency of N cycles for completion of an (A*B)+C operation and said N cycles define a latency period;

(3) means for starting, within a first latency period, five of said (A*B)+C operations including:
   said light direction vector dotted with the normal vector,
   said light direction vector dotted with said light direction vector,
   said light direction vector dotted with said view direction vector,
   said view direction vector dotted with said view direction vector, and
   said view direction vector dotted with said normal vector; and (4) means for using the results of each of said five operations started in step (3) in subsequent latency periods to produce vector dot products L1.N1 and H1.N1, said vector dot products L1.N1 and H1.N1 being used in a lighting equation to generate three-dimensional color images based on user-defined positions of simulated light sources.

19. The system of claim 18, further comprising means for displaying, on a video screen, surface illumination resulting from the effect of the simulated light sources at the user-defined positions.

* * * * *

UNITED STATES PATENT AND TRADEMARK OFFICE
CERTIFICATE OF CORRECTION

PATENT NO. : 5,896,135

DATED : April 20, 1999

INVENTOR : Steven Shi-Long Yang

It is certified that an error appears in the above-identified patent and that said Letters Patent is hereby corrected as shown below.

In column 15, line 8, please delete "operation" and insert --operations-- in place thereof.

Signed and Sealed this

Eighth Day of February, 2000

*Attest:*

Q. TODD DICKINSON

*Attesting Officer*   *Commissioner of Patents and Trademarks*